Aug. 10, 1937.  G. P. DENISON  2,089,544
NUT CRACKING MACHINE
Filed Feb. 3, 1937  3 Sheets-Sheet 1
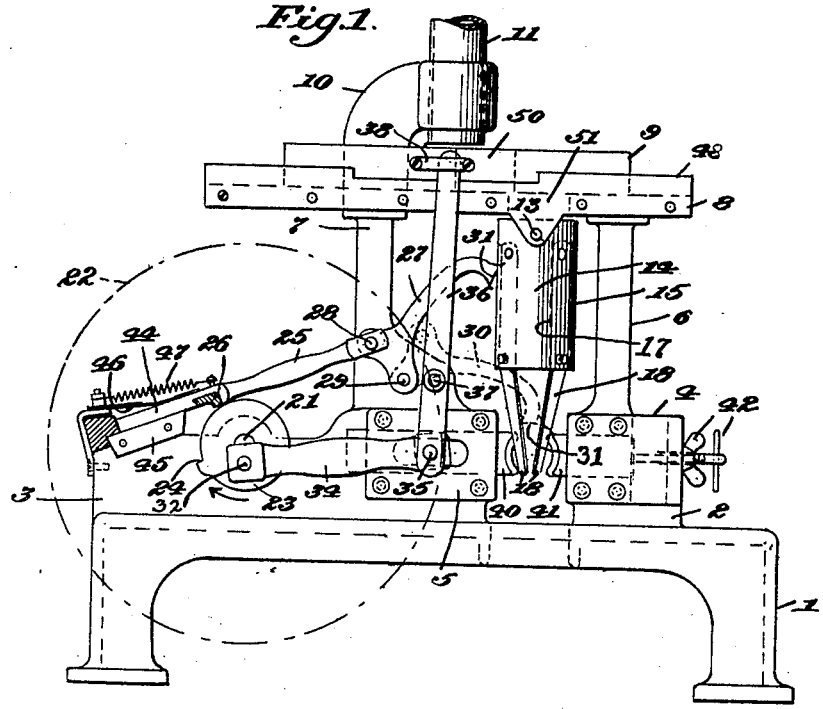
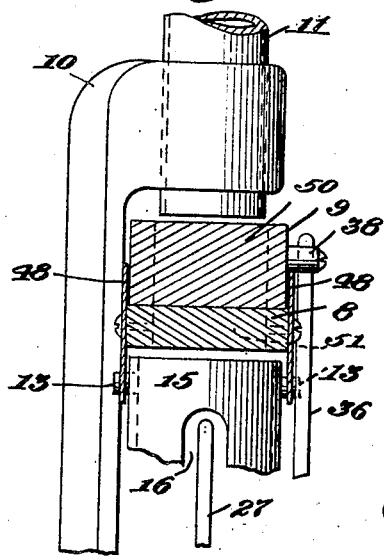
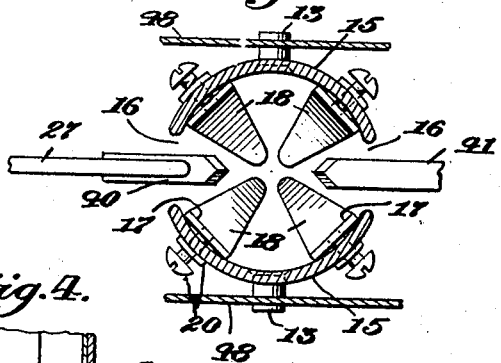
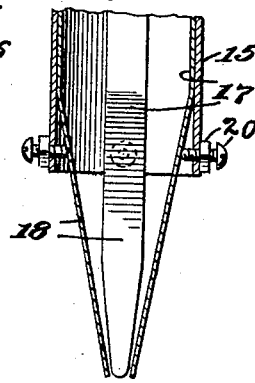
Inventor:
George P. Denison,
by Joseph W. Harris
Att'y.

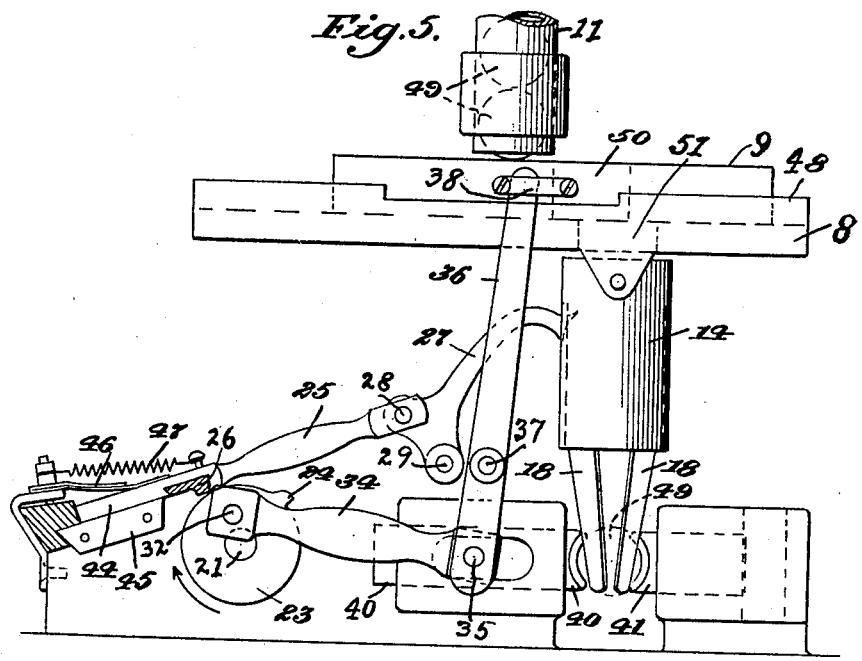
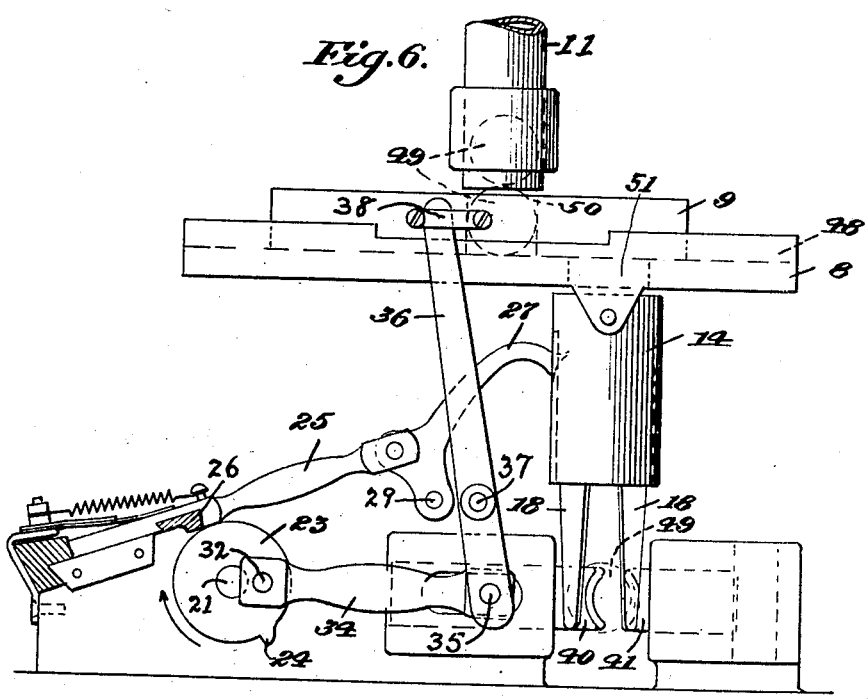

Aug. 10, 1937.  G. P. DENISON  2,089,544
NUT CRACKING MACHINE
Filed Feb. 3, 1937  3 Sheets-Sheet 3
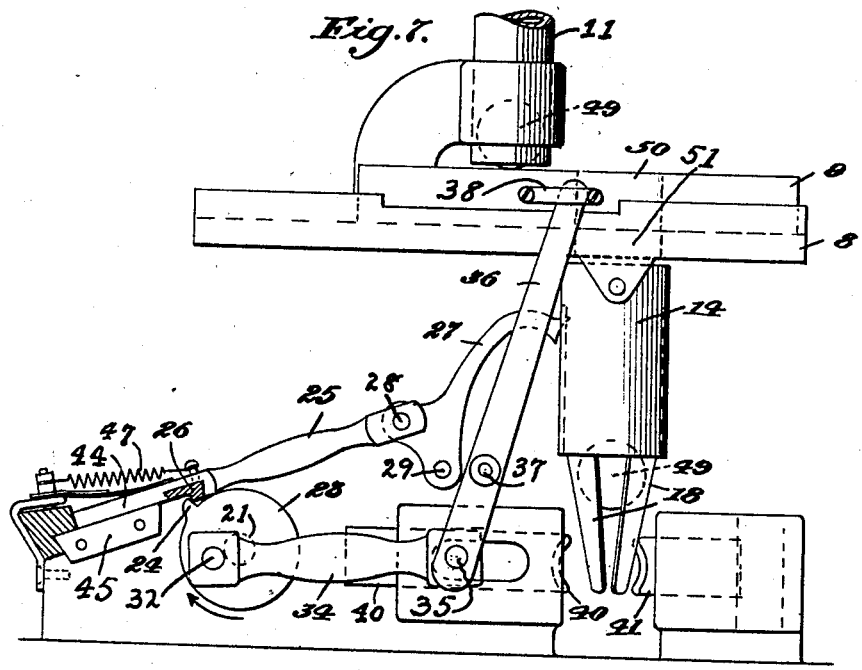
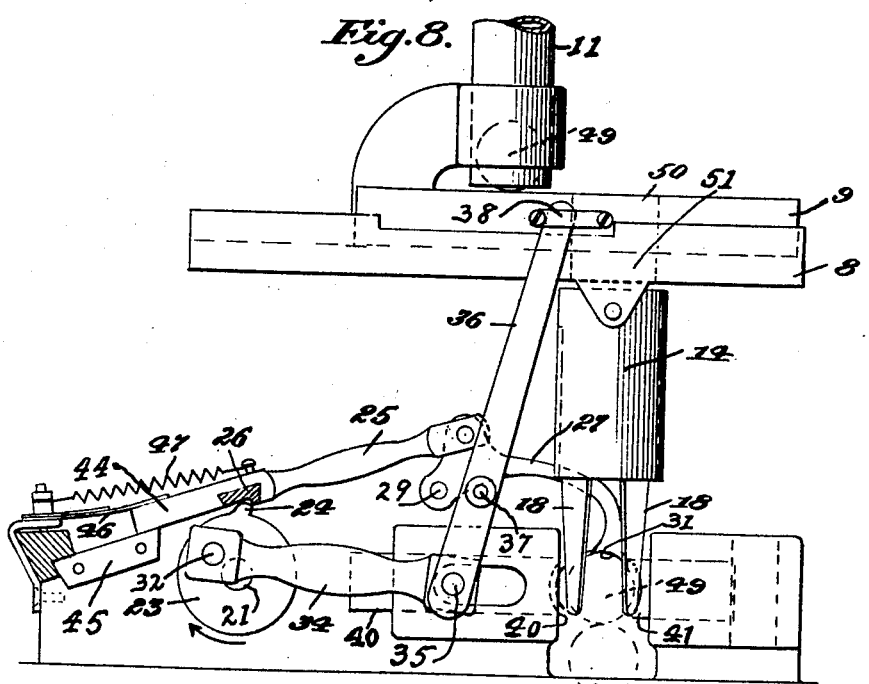
Inventor:
George P. Denison,
by Joseph W. Harris
Att'y.

Patented Aug. 10, 1937

2,089,544

UNITED STATES PATENT OFFICE 2,089,544

NUT CRACKING MACHINE

George P. Denison, Honolulu, Territory of Hawaii

Application February 3, 1937, Serial No. 123,941

6 Claims. (Cl. 146—12)

This invention relates to nut splitting or cracking machines, and more particularly for splitting or cracking Macadamia nuts, the machine being of the type in which nuts are automatically fed from a suitable hopper to a feeding device, from which latter they are forcibly placed and held in position in a resilient holder wherein they are split or cracked, and later the split nut expelled from the machine. The machine is especially adapted to split or crack Macadamia nuts the shells of which are quite resilient.

An object of the invention is to provide a nut splitting or cracking machine in which nuts are successively placed in a holder, then spilt or cracked by suitable blades, and thereafter expelled.

A further object is to provide a machine which will split or crack the shells without crushing the "meats".

A further object is to provide a machine which is automatic, simple and safe in operation, with a high capacity, and having very little wear on its moving parts.

Other objects of the invention will be apparent to those skilled in the art after reading the specification.

In the accompanying drawings,—

Figure 1 represents a side view of the machine, with a view in dotted lines of the rocker arm in its advanced position, placing a nut to be cracked between the nut-holding spring tongues;

Figure 2 is a broken view of the feed tube and its support, also sectional views of the feed block and its supporting table, and broken views of the centering tube and rocker arm;

Figure 3 is a horizontal sectional view, looking down through the centering tube, with the nut-holding spring tongues and splitting or cracking blades in elevation;

Figure 4 is a vertical sectional view of the centering tube showing two spring tongues in section, and one as a plan view, and showing the adjusting screws for the spring tongues; and Figures 5, 6, 7, and 8 are side views of moving parts, in elevation, with parts in section, showing the sequence of operations of the parts, with nuts passing through the machine.

In Figure 1, a base 1 is provided with standards 2, 3, guide blocks 4, 5, and columns 6, 7, the latter supporting the feed table 8 and feed block 9; the column 7 also supporting the feed tube holder 10 and feed tube 11, the latter to receive nuts from a hopper (not shown). Suspended from the feed table 8 by the lugs 13 is a swiveled centering device 14 consisting of a tube-like structure 15 slotted from the bottom, upwards, as shown at 16 in Figures 2 and 3. Within the tube 15 are secured adjustable springs 17 having lower nut-holding tongues 18, the adjustment thereof being effected by the screw and check-nut 20, Figures 3 and 4. Upon the standard is supported a shaft 21 driven by a pulley 22, (shown in dotted lines), and on the near side of the shaft 21 is the crank disc 23 with its cam projection 24, which latter is constructed to push forward the push rod 25 by the engagement of cam projection 24 with the shouldered insert 26 (Figures 7 and 8); the insert 26 may be made of rawhide or other suitable material. The push rod 25 is connected to the rocker arm 27 by a pin 28, the rocker arm being swiveled on a lug 29 secured to the standard 7; the forward movement of the push rod 25 moves the rocker arm to the position shown in dotted lines at 30 with its feeding end 31 in a position to force a nut between the spring tongues 18, as shown in Figure 8.

Upon the side of the crank disc 23 is a crank pin 32 supporting the connecting rod 34, the right hand end of which latter carries a pin 35 the outer end of which engages the lower end of the lever 36, the lever being swiveled on a pin 37 secured to the standard 7. The inner end of the pin 35 engages the movable nut-splitting or nut-cracking blade 40 shown in different positions in Figures 1, 5, 6, 7, and 8. A co-operating but stationary and adjustable abutment or blade 41 is supported within a socket in the guide block 4, the adjustment being made by the screw and check nut 42. The upper end of the lever 36 moves in a space behind the strap 38 on the feed block 9, the oscillation of the lever 36 moving the feed block 9 forwards and backwards as shown in Figures 5 to 8, to receive and deliver nuts 49, Figures 6 and 7.

The left end 44 of push rod 25 travels on the guide block 45, which latter, if desired, may be constructed to be vertically adjustable to vary the extent of movement, or "low point" of the curved face 31 of the rocker arm 27. The end 44 is held in place by the flat spring 46, and the push rod 25 is retracted, after its forward movement, by the spring 47. The movement of the lever 36 moves the feed table 9 upon the feed block 8 between side plates 48, as shown in Figure 2.

In the operation of the machine, the rotation of the shaft 21 rotates the cam disc 23 and reciprocates the connecting rod 34, the latter oscillating the lever 36 which moves the feed plate 9 right and left to receive a nut 49 in the opening 50, Figure 6, and thereafter deliver the nut through opening 51 to the centering device 14, Figure 7. In Figure 8 the connecting rod 34 is beginning the cycle of movements, the connecting rod 34 is starting a forward movement and the feed plate 9 is starting a movement to the left; the cycle continues as shown in Figures 5, 6, 1, and 7, during which movements the opening 50 in the feed plate 9 receives a nut 49 from the tube 11, Figure 6, and thereafter the direction of movement of the connecting rod 34 changes, as shown by the position of cam disc 23, which now reverses the direction of movement of the feed plate 9, Figures 1 and 7, the latter figure (Figure 7) showing the openings 50 and 51 as coinciding, and the nut 49 as having dropped through opening 51 into the centering device 14. The position of the cam disc 23 and lever 36 in Figure 7 is such that the feed plate 9 has about reached its limit of movement to the right, and the continued movement of cam disc 23 now reverses the direction of movement of the connecting rod 34 which in turn moves the lever 36 to the left as shown in Figure 8, and the cycle of operations is repeated. During the above cycle of movements, the cam disc 23 and cam projection 24 are moving as shown in successive Figures 5, 6, 1, 7, and 8; in Figure 7 the cam projection 24 engages the shoulder 26 thereby moving forward the pushrod 25 and stretching the spring 47, Figure 8, and also actuating the rocker arm 27, moving it (Figures 7 and 8) to engage and push the nut 49 down between the spring tongues 18, Figure 8, and also displace a previously cracked nut 53. With the continued movement of the cam disc 23, the cam projection 24 slips off the shoulder 26, whereupon the stretched spring 47 (Figure 8) snaps back the push rod 25 and raises the rocker arm 27 as shown in Figure 5. As shown in Figure 8, the splitting or cracking blade 40 is at the extreme left with a nut 49 in position to be split or cracked. The movement of cam disc 23 now advances the connecting rod 34, Figure 5, and its continued movement advances the blade 40 with a rapid movement, driving the same against the nut 49, Figure 6, which is pressed against blade 41 and split or cracked on a line around the entire nut, the nut being retained between the springs 18. The continued movement of the cam disc 23 withdraws the blade 40 as shown in Figures 1, 7, and 8, in which latter (Figure 8) the descending rocker arm 27 forces down a new nut 49 and expels the split or cracked nut 53, the latter falling into a receiver (not shown). The successive movements of the rocker arm 27 and blade 40 have been described separately in order to more clearly describe their operation, but since all of the movements of the co-operating elements depend upon the rotation of the cam disc 23, the several operations described take place in a continuous and orderly succession.

I claim—

1. A nut-cracking machine comprising as co-operating elements a cam disc, a cam thereon, a connecting rod connected to and actuated by said cam disc, a lever, a nut-feeding means actuated by said lever, a nut-holding means, said lever and an associated movable nut-cracking blade connected with and actuated by said connecting rod, an abutment opposed to said blade, a push rod, a rocker arm, said rocker arm actuated by said push rod, a shoulder on said push rod, said cam adapted to engage said shoulder and move said push rod and rocker arm and thereafter to disengage from said shoulder, said rocker arm adapted to push a nut in said nut-holding means in position to be cracked between said nut-cracking blade and abutment, means to retract said push rod and rocker arm after the disengagement of said cam, said blade moved into nut-cracking position after the rocker arm has been retracted, and said blade thereafter withdrawn from said nut-cracking position.

2. A nut-cracking machine comprising as co-operating elements a cam disc, a cam thereon, a connecting rod connected to and actuated by said cam disc, a lever, a nut-feeding means actuated by said lever, said nut-feeding means constructed to feed nuts in spaced succession, a nut-holding means, said lever and an associated movable nut-cracking blade connected with and actuated by said connecting rod, an abutment opposed to said blade, a push rod, a rocker arm, said rocker arm actuated by said push rod, a shoulder on said push rod, said cam adapted to engage said shoulder and move said push rod and rocker arm and thereafter to disengage from said shoulder, said rocker arm adapted to push a nut in said nut holding means in position to be cracked between said nut-cracking blade and abutment, a spring to retract said push rod and rocker arm after disengagement of said cam, said blade moved into nut-cracking position after the rocker arm has been retracted, and said blade thereafter withdrawn from said nut-cracking position.

3. A nut-cracking machine comprising as co-operating elements a cam disc, a cam thereon, a connecting rod connected to and actuated by said cam disc, a lever, said lever connected with and actuated by said connecting rod, a nut-feeding means actuated by said lever, a nut-holding means, opposed nut-cracking blades, one of said blades consisting of a movable blade connected with and actuated by said connecting rod, a push rod, a rocker arm, said rocker arm actuated by said push rod, a shoulder on said push rod, said cam adapted to engage said shoulder and move said push rod and rocker arm and thereafter to disengage from said shoulder, said rocker arm adapted to push a nut in said nut-holding means in position to be cracked by said nut-cracking blades, means to retract said push rod and rocker arm after the disengagement of said cam, said movable blade moved into nut-cracking position after the rocker arm has been retracted, and said movable blade thereafter withdrawn from said nut-cracking position.

4. A nut-cracking machine comprising as co-operating elements a cam disc, a cam thereon, a connecting rod connected to and actuated by said cam disc, a lever, said lever connected with and actuated by said connecting rod, a nut-feeding means actuated by said lever, a nut-centering and nut-holding means, opposed nut-cracking blades, one of said blades consisting of a movable blade connected with and actuated by said connecting rod, a push rod, a rocker arm, said rocker arm actuated by said push rod, a shoulder on said push rod, said cam adapted to engage said shoulder and move said push rod and rocker arm and thereafter to disengage from said shoulder, said rocker arm adapted to push a nut in said nut-holding means in position to be cracked by said nut-cracking blades, means to retract said push rod and rocker arm after the disengagement of said cam, said movable blade moved into nut-cracking position after the rocker arm has been retracted, and said movable blade thereafter withdrawn from said nut-cracking position.

5. A nut-cracking machine comprising as co-operating elements a cam disc, a cam thereon, a connecting rod connected to and actuated by said cam disc, a lever, said lever connected with and actuated by said connecting rod, a nut-feeding means actuated by said lever, a nut-centering and nut-holding means, said nut-holding means comprising spring tongues, opposed nut-cracking blades, one of said blades consisting of a movable blade connected with and actuated by said connecting rod, a push rod, a support for one end of said push rod, a rocker arm, said rocker arm actuated by said push rod, a shoulder on said push rod, said cam adapted to engage said shoulder and move said push rod and rocker arm and thereafter to disengage from said shoulder, said rocker arm adapted to push a nut in said nut-holding spring tongues in position to be cracked by said nut-cracking blades, means to retract said push rod and rocker arm after the disengagement of said cam, said movable blade moved into nut-cracking position after the rocker arm has been retracted, and said movable blade thereafter withdrawn from said nut-cracking position.

6. A nut-cracking machine comprising as cooperating elements a cam disc, a cam thereon, a connecting rod connected to and actuated by said cam disc, a lever, said lever connected with and actuated by said connecting rod, a nut-feeding means actuated by said lever, a nut-centering and nut-holding means, said nut-holding means comprising spring tongues, opposed nut-cracking blades, one of said blades consisting of a movable blade connected with and actuated by said connecting rod, a push rod, a support for one end of said push rod, a rocker arm, said rocker arm actuated by said push rod, a shoulder on said push rod, said cam adapted to engage said shoulder and move said push rod and rocker arm and thereafter to disengage from said shoulder, said rocker arm adapted to push a nut in said nut-holding spring tongues in position to be cracked by said nut-cracking blades, a spring to quickly retract said push rod and rocker arm after the disengagement of said cam, said movable blade moved into nut-cracking position after the rocker arm has been retracted, and said movable blade thereafter withdrawn from said nut-cracking position.

GEORGE P. DENISON.